United States Patent
Brassard

(10) Patent No.: US 12,547,169 B2
(45) Date of Patent: Feb. 10, 2026

(54) ACHIEVING OPTIMAL AUTONOMOUS VEHICLE POSITIONING FOR WIRELESS DATA TRANSFER

(71) Applicant: GM Cruise Holdings LLC, San Francisco, CA (US)

(72) Inventor: Joseph Brassard, Somerville, MA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 345 days.

(21) Appl. No.: 18/321,732

(22) Filed: May 22, 2023

(65) Prior Publication Data

US 2024/0393783 A1    Nov. 28, 2024

(51) Int. Cl.
*G05D 1/00* (2006.01)
*H04B 17/318* (2015.01)

(52) U.S. Cl.
CPC ......... *G05D 1/0022* (2013.01); *G05D 1/0088* (2013.01); *H04B 17/328* (2023.05)

(58) Field of Classification Search
CPC ... G05D 1/0022; G05D 1/0088; H04B 17/328
See application file for complete search history.

(56) References Cited

U.S. PATENT DOCUMENTS

| | | | | |
|---|---|---|---|---|
| 11,995,996 B1 * | 5/2024 | Puglisi | ................... | B64U 10/14 |
| 2011/0317635 A1 * | 12/2011 | Swaminathan | ... | H04W 36/0088 |
| | | | | 370/329 |
| 2017/0257779 A1 * | 9/2017 | Zerick | ................. | H04B 7/18506 |
| 2020/0068455 A1 * | 2/2020 | Badic | ..................... | H04W 88/06 |
| 2020/0162980 A1 * | 5/2020 | Kalkunte | ............. | H04B 7/0617 |
| 2022/0095124 A1 * | 3/2022 | Wu | ..................... | G06K 7/10366 |
| 2023/0133992 A1 * | 5/2023 | Ganju | ..................... | H04B 17/27 |
| | | | | 370/252 |
| 2023/0217319 A1 * | 7/2023 | Ju | ......................... | H04W 36/03 |
| | | | | 370/331 |
| 2024/0179664 A1 * | 5/2024 | Wu | ........................ | G01S 19/46 |

FOREIGN PATENT DOCUMENTS

WO    WO-2022067126 A1 *   3/2022   ............ H04W 16/22

* cited by examiner

*Primary Examiner* — Calvin Cheung
(74) *Attorney, Agent, or Firm* — CANTOR COLBURN LLP

(57) ABSTRACT

The disclosed technology provides solutions for improving wireless data transfer between an autonomous vehicle (AV) and a base station. In some aspects, a process of the disclosed technology can include steps for navigating an autonomous vehicle (AV) toward a base station along a first heading, receiving a first set of data from the base station, and computing a signal quality metric for the base station based on the first set of data. In some aspects, the process can further include steps for navigating the AV toward the base station along a second heading, receiving a second set of data from the base station, computing a second signal quality metric for the base station based on the second set of data, and determining an optimal heading for the AV to communicate with the base station based on the first signal quality metric and the second signal quality metric. Systems and machine-readable media are also provided.

20 Claims, 6 Drawing Sheets

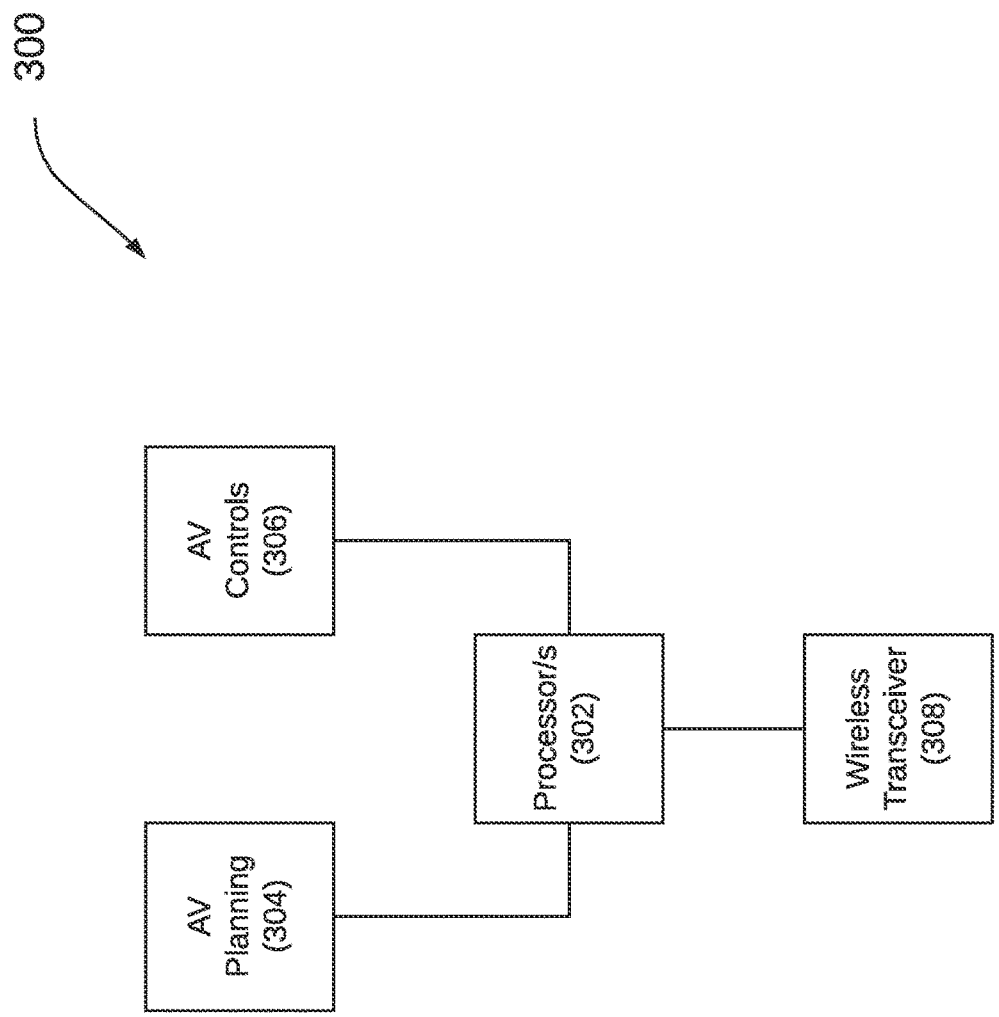

ACHIEVING OPTIMAL AUTONOMOUS VEHICLE POSITIONING FOR WIRELESS DATA TRANSFER

BACKGROUND

1. Technical Field

The present disclosure generally provides solutions for improving wireless data transfer and in particular, provides solutions for optimizing autonomous vehicle (AV) positioning to facilitate wireless data exchange with a base station.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions conventionally performed by human drivers, such as performing navigation and routing tasks necessary to provide safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to routing, planning, and obstacle avoidance.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail by the accompanying drawings in which:

FIG. 3 illustrates an example system that can be used to facilitate optimal AV positioning for wireless data transfer, according to some aspects of the present disclosure.

DETAILED DESCRIPTION

Figure 1:
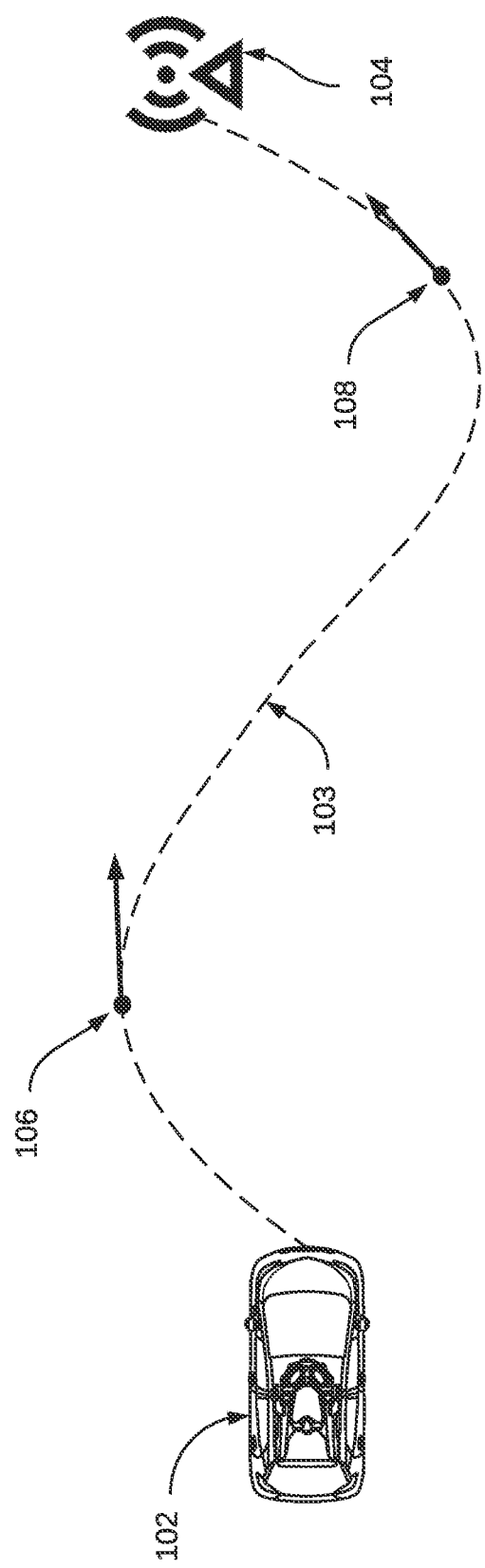
FIG. 1 illustrates a top perspective view of an autonomous vehicle (AV) navigation path toward a base station, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Autonomous vehicles (AVs) can be configured to store information about their operations, such as by capturing data for a surrounding environment using one or more sensors, including but not limited to one or more Light Detection and Ranging (LiDAR) sensors, camera (image) sensors, Radio Detection and Ranging (RADAR) sensors, and the like. AV data collection can also include the storage of other types of information, including results generated by different systems of the AV, such as different components (or layers) of the AV's software stack. Data stored by the AV is referred to collectively herein as road data.

Some (or all) of the collected road data may be offloaded from the AV, for example, to facilitate AV system diagnostics, training, and software development, road data is sometimes collected after AV operations have been halted. In some approaches, storage drives on the AV can be physically removed or hot-swapped, so that the road data can be downloaded from the drive by one or more other computer systems. AV data offload may be performed wirelessly, such as by transmitting the road data from the AV to a receiving base station, e.g., using a wireless transceiver on the AV. In approaches where high-bandwidth wireless frequency bands are used, such as when transmitting data in the millimeter wave (mmWave) band, it can be difficult to achieve optimally high data rates when transmitting data between the AV and the base station due to misalignment between one or more antennas of the AV and one or more antennas of the base station.

Aspects of the disclosed technology provide solutions for positioning the AV to achieve optimally high data transfer speeds when wirelessly transacting data. In some approaches, optimal AV positioning can be achieved by autonomously navigating the AV along a path that varies an angle of alignment between one or more antennas of the AV and one or more antennas of the base station. For example, an AV path can be configured to cause an angle of azimuth between the AV (or an antenna of the AV's wireless system) and the base station, to vary. While sweeping the azimuth angle, signal quality characteristics for data transmissions between the AV and the base station can be monitored and correlated with a current heading/azimuth angle/position of the AV to determine an optimal position of the AV for transacting data with the base station. For example, signal quality metrics such as signal power characteristics can be measured at the AV and used to determine an optimal heading for optimizing alignment between the AV's wireless system and the base station. Although different signal quality metrics can be used, signal power characteristics, such as a Received Signal Strength Indicator (RSSI) metric can be used to calculate (or infer) transmission signal quality. For example, by identifying the heading (or azimuth angle) that correlates with the greatest RSSI transmissions received by the AV, determinations can be made as to the optimal heading for transacting data with the base station.

Similar approaches can be used to determine an optimal angle of elevation for the AV. For example, the AV's angle of elevation can be varied as data is transacted between the AV and the base station. As the elevation angle is varied, signal quality metrics (such as RSSI) can be used to determine an optimal elevation for the AV. Once optimal headings and elevations (e.g., an optimal AV pose) have been identified, data can be wirelessly transacted with the base station. For example, by commencing wireless data transfers with the base station when the AV is optimally positioned (e.g., optimal pose) AV downtime can be minimized as road data is offloaded at maximal (or near maximal) transmission speeds.

FIG. 1 illustrates a top perspective view of an autonomous vehicle (AV) 102 as it navigates toward a base station 104, along path 103. Navigation path 103 can be one that is selected by a planning module of AV 102 to continuously vary (or sweep) an angle of azimuth between AV 102 and base station 104. By way of example, a heading of AV 102 at position 106 along path 103 is different than a heading of AV 102 at position 108 on path 103. As such, the azimuth angle between a wireless communication system (wireless transceiver) of AV 102 and base station 104 can vary continuously as AV 102 proceeds along path 103. That is, while sweeping the azimuth angle (by varying the AV's heading), an angle between a (fixed) antenna of the AV's wireless transceiver and a (fixed) base station can be similarly varied.

In practice, AV 102 can be configured to receive/send (e.g., via a wireless transceiver) wireless signals to/from base station 104. In some approaches, wireless signals received from base station 104 can be analyzed to determine one or more signal quality metrics, such as an RSSI metric, as discussed above. In some aspects, other signal quality metrics, such as bandwidth, throughput and/or signal-to-noise ratio (SNR) may be used. These signal quality metrics can be used to infer when AV 102 is optimally positioned to wirelessly transact data with base station 104. In some implementations, a position or pose of AV 102 can be adjusted along other dimensions, such as by modifying an elevation (or pitch) of the AV to also determine an optimal angle of elevation to facilitate wireless data transmissions, or by modifying a roll of the AV, etc. Further details regarding the modification of AV elevation are discussed in relation to FIGS. 2A and 2B, below.

Figure 2A:
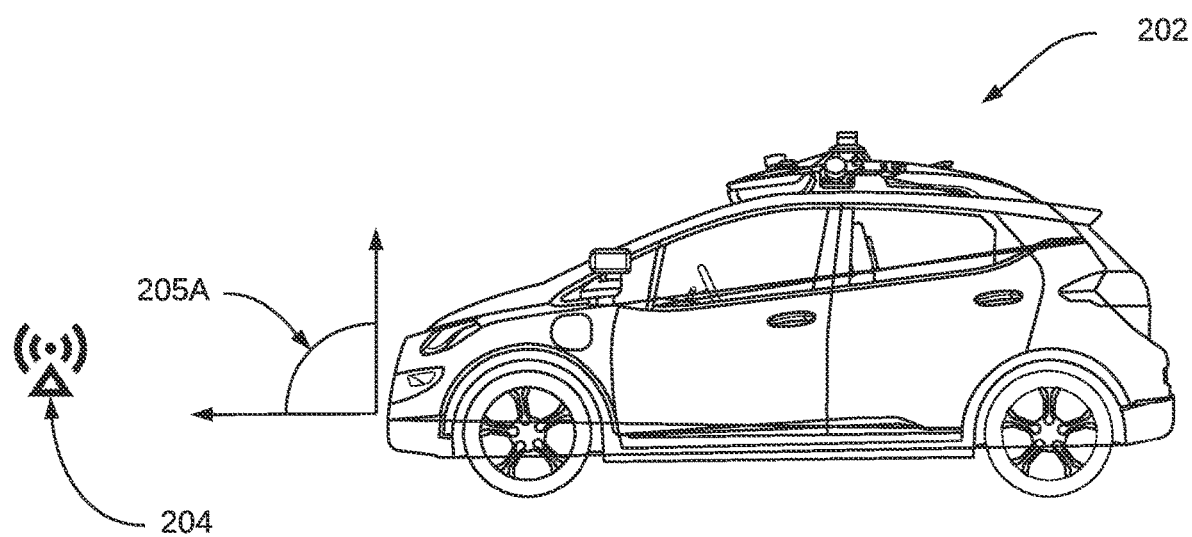
FIGS. 2A and 2B illustrate examples of AV elevation changes that can be performed to optimize wireless data transfer, according to some examples of the present disclosure.
Figure 2B:
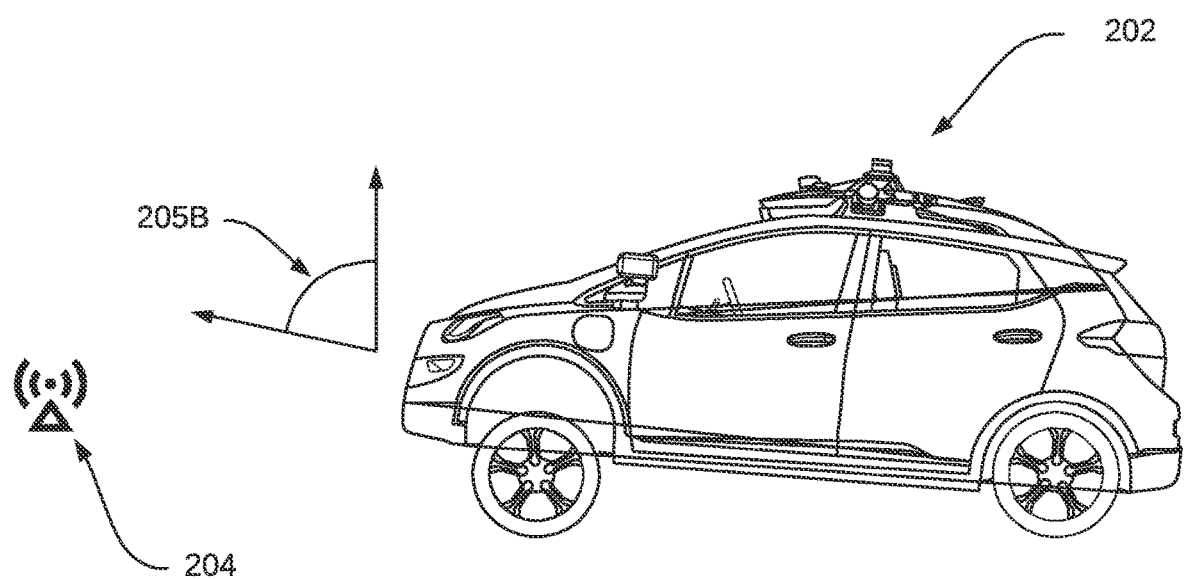

FIGS. 2A and 2B illustrate examples of AV elevation changes that can be performed to optimize wireless data transfer, e.g., between an AV and a base station. In the example illustrated by FIG. 2A, AV 202 is positioned at a first angle of elevation 205A, with respect to base station 204. In this position, AV 202 can receive wireless signals (such as one or more data packets) from base station 204 and use the received signals to determine/calculate one or more signal quality metrics, such as an RSSI metric, a bandwidth metric, and/or an SNR, etc. The calculated metric can provide an indication of the relative signal quality, which can depend on an alignment between the wireless transmission system (or an antenna for the same) associated with AV 202, and one or more antennas of base station 204. For example, in implementations that utilize RSSI as a measure of signal quality, a low RSSI metric can indicate that an antenna of the AV's transceiver is not aligned with an antenna of the communicating base station.

The elevation of AV 202 can then be changed, e.g., to sweep through various elevation angles to determine an optimal elevation for communication with base station 204. For example, FIG. 2B illustrates AV 202 positioned at an elevated angle 205B, that is different from angle 205A. Once repositioned at angle 205B signal quality metrics for signals received from base station 204 can be analyzed (e.g., to determine RSSI metrics, or other signal quality metrics). By way of example, if RSSI metrics for received wireless signals are greater at angle 205B than for RSSI metrics received at angle 205A, then it may be determined that wireless data communications with base station 204 are better conducted while AV 202 is positioned at angle 205B. It is understood that a process for determining an optimal angle of elevation may include the receipt of two or more signal transmissions from base station 204. For example, a wireless system of AV 202 may be configured to continuously receive wireless signals from base station 204, and to determine/calculate corresponding signal quality metrics for the same, as an elevation angle of AV 202 is increased or decreased.

Depending on the desired implementation, the elevation angle of AV 202 may be modified by a control system (not illustrated) of AV 202, for example, that is configured to automatically increase or decrease pressure, and thereby vertical elevation, in one or more portions of the AV's suspension system. By way of example, air compressors can be used to increase/decrease an elevation of the front (or back) of AV 202. In other implementations, adjustments to the suspension system of AV 202 may be used to vary a position of AV 202 along a roll axis, e.g., by increasing vertical displacement for one or more suspension systems on a similar side of AV 202. By way of example, a roll axis of the AV may be varied by adjusting (increasing or decreasing) a vertical displacement of the front and/or rear suspension on either side of the AV.

Once optimal AV elevation/heading/pose parameters have been identified, the AV can proceed on a course (e.g., in a direction of the base station) using some (or all) of the parameters found to optimize signal quality. In some implementations, it may be determined that the AV can stop (park) to complete a data transfer session. In such instances, the perception and planning layers of the AV software stack may be utilized to identify and navigate to a location where the AV may best communicate with the base station. For example, the AV's perception system may be configured to identify locations (parking stalls) oriented in a manner that optimizes the AV's azimuth angle, elevation, and/or pitch with respect to the base station, including a route taken to the locations to optimizes the AV's azimuth angle, elevation, and/or pitch with respect to the base station to maximize signal quality and potential throughput.

The AV perception system may also be configured to identify potential barriers or obstacles affecting AV-to-base station connectivity. For example, if signal quality metrics for a given heading/elevation/pose suddenly decrease (e.g., a sudden drop in RSSI or other deterioration in other metrics), for example, due to blockage by an object, such as a large vehicle, then the AV may determine that the heading/elevation/pose are optimal, but that the AV should wait for the object to pass. Alternatively, it may be determined that the AV should navigate around a potentially interfering object and continue its navigation using the previously determined heading/elevation/pose parameters.

FIG. 3 illustrates an example system 300 that can be used to facilitate optimal AV positioning for wireless data transfer. System 300 includes one or more processors (or computers/compute nodes) 302 configured to process data. Processors 302 are communicatively connected to an AV planning module 304, AV controls 306, and at least one wireless transceiver 308.

In operation, planning module 304 can be configured formulate a navigation path of the AV, such as a path toward a base station (e.g., path 103) that can be used to determine an optimal position or pose of the AV to perform wireless data communication with a base station (not illustrated). In conjunction with planning module 304, AV controls 306 can be configured to navigate an associated AV (such as AVs 102, 202, discussed above) along a navigation path (e.g., path 103). Additionally, controls 306 can be used to control AV pose, such as by automatically adjusting an elevation of the AV by adjusting the suspension corresponding with one or more tires of the vehicle.

Wireless transceiver 308 can be configured to receive periodic (or continuous) signal transmissions from a base station. In operation with controls 306, the received signals can be used to determine signal quality metrics, as well as how varying quality metrics correspond with the heading/pose of the AV. As such, signal quality metrics (such as RSSI) can be used by processors 302 to determine an optimal position/pose of the AV to conduct wireless data transfers with the base station. Other signal quality metrics may be used instead of, or in addition to, an RSSI metric. For example, signal quality metrics may additionally include measures of signal nose, bandwidth, Packet Error Rate (PER), Bit Error Rate (BER), a Modulation and Coding Scheme (MCS) index, or the like. In some implementations, signal quality measurements may be based on differences between metrics, such as the difference between a noise measurement and RSSI, which can yield a SNR measurement. In such approaches, the higher the RSSI is above the signal noise level, the better the signal quality.

Figure 4:
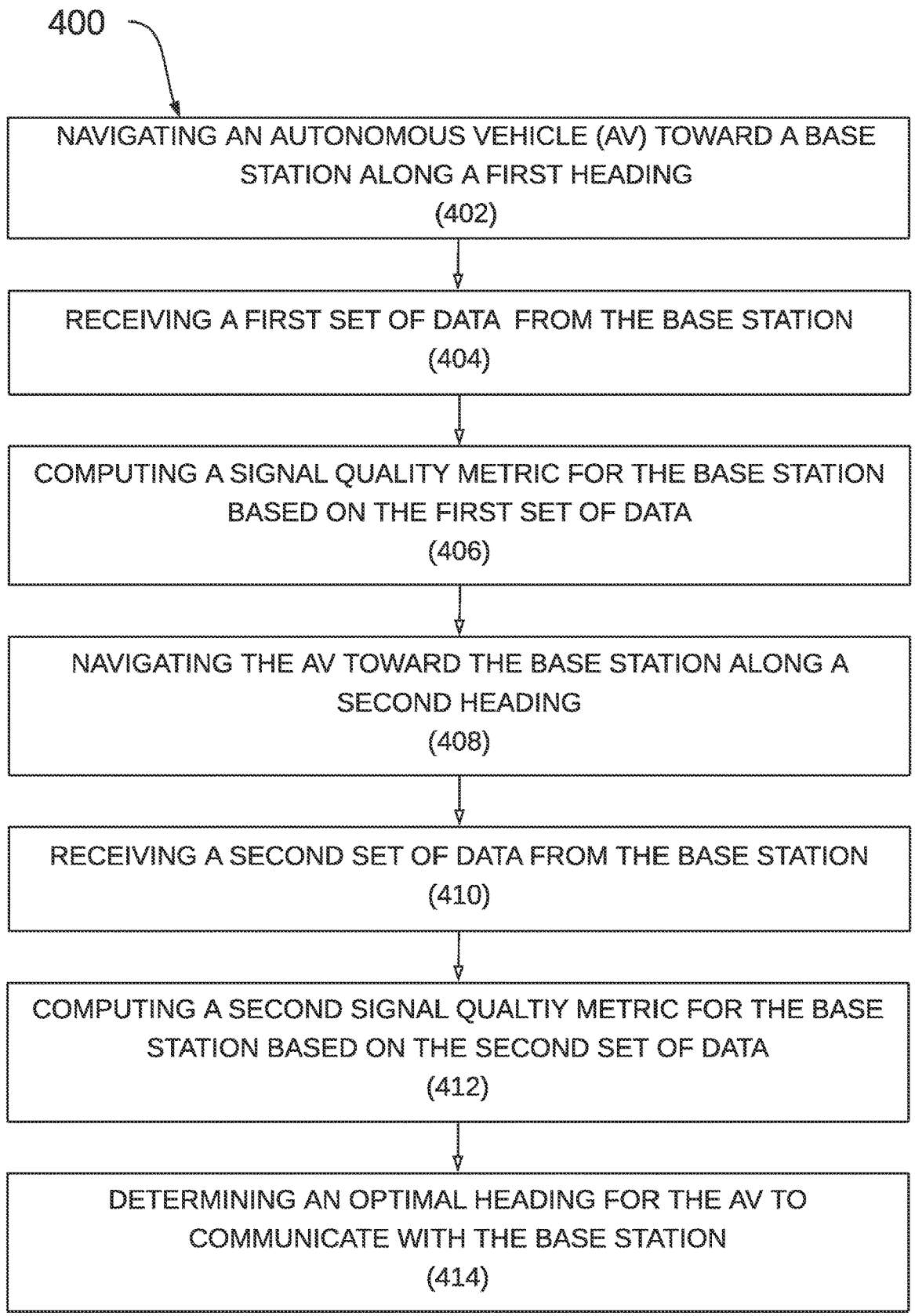
FIG. 4 illustrates steps of an example process for optimally positioning an AV to perform wireless data offload operations, according to some aspects of the disclosed technology.

FIG. 4 illustrates steps of an example process 400 for optimally positioning an AV to perform wireless data offload operations. At step 402, process 400 includes navigating an autonomous vehicle (AV) toward a base station along a first heading. As discussed above with respect to FIG. 1, an AV (e.g., AV 102) can be navigated along a winding path that results in a sweep of an azimuth angle between the AV and the base station (e.g., base station 104) and along a first part of this winding path, the AV is traveling according to the first heading. In some approaches, this first heading is directly at the base station (e.g., the shortest path between the current location of the AV and the position of the base station) while in other embodiments, the first heading can correspond to a particular azimuth angle between the AV and the base station (e.g., the azimuth angle that provided the highest wireless signal strength between the AV and the base station). For example, the first heading may be one that is selected based on historic information about signal quality metrics associated with a particular base station, e.g., such that the AV can choose, as an initial route, one that was previously determined to correspond with the best wireless signal metrics. In another example, sensors (e.g., cameras, LIDAR, RADAR, etc.) and the perception and/or planning components of the AV stack can be used to identify potential barriers/blockages and/or causes of interference to signals to and from the AV. For instance, the AV may look to avoid detected other vehicles, wireless units (e.g., people using phones or other computing devices), etc. that might produce interference for the AV and instead choose a parking location and/or base station that is located in a region that is less crowded and visually would appear to be susceptible to less wireless interference.

Subsequently, at step 404, process 400 includes receiving a first set of data from the base station. Receipt of the first set of data can include the receipt of any wireless signals from the base station. In other configurations, the first set of data may contain data packets, for example, that contain information useful to the determination/calculation of signal quality metrics, while the AV is traveling according to the first heading. In some embodiments, the AV travels the first heading based on directions and/or maneuvers generated by an AV stack (e.g., LIDAR, camera, RADAR and other sensor inputs that are processed by an AV stack to navigate the AV). Accordingly, the first heading is an input to this AV stack and may be adjusted to account for obstacles encountered by the AV and/or general rules/constraints that the AV adheres to but the overall path navigated by the AV is largely influenced by the first heading. As such, the AV can generally proceed along the first heading, while also navigating any obstacles and/or adhering road conditions (curves and/or turns etc.) that are necessary to maintain the first heading, while ensuring safety standards are met.

At step 406, process 400 includes computing a signal quality metric for the base station based on the first set of data, wherein the first signal quality metric corresponds with the first heading of the AV. In some aspects, the signal quality metric can include a received signal power metric, such as an RSSI metric. Depending on the desired implementation, other signal quality metrics may be calculated, without departing from the scope of the disclosed technology. For example, the signal quality metrics can include packet loss ratio, a packet error rate, a bit error rate, round-trip delay, round-trip time, throughput, bandwidth, etc.

In implementations where RSSI is calculated, the RSSI can be based on an amount of power incident on an antenna of the AV's wireless transceiver. In other instances, such as when calculating a packet loss ratio, or a bit error rate, the signal quality metric can be based on the fidelity of information received at the AV from the base station.

At step 408, the process 400 includes navigating the AV toward the base station along a second heading, wherein the second heading is different than the first heading. For example, the second heading can correspond to an azimuth angle between the AV and the base station that is different from the azimuth angle of the AV at the first heading (step 402). In some instances, changes in the AV heading (e.g., to the second heading) can be triggered based on a determination that the signal quality metric/s corresponding to the first heading fail to meet one or more quality standards. For example, transition to the second heading can result from a determination that the signal quality metrics associated with the first heading are below a predetermined quality threshold. The set of thresholds can depend on the desired implementation, but may include one or more minimum signal quality metric/s for the AV-to-base station connection, such as a lowest acceptable RSSI, a highest packet loss ratio, a highest possible bit error rate, a highest round-trip delay, a highest acceptable round-trip time, a lowest acceptable throughput, and/or a lowest possible bandwidth, etc. In some instances, signal quality metrics may be measured relative to known optimal measures for that parameter, such as by comparing a current metric to a known or maximum possible signal quality metric. By way of example, transitions between AV headings may be triggered when a quality metric declines by a predetermined amount, such as when signal quality is 10% below a maximum (or optimal) RSSI value. In response to the signal quality metric for the first heading meeting the set of thresholds (e.g., meeting the highest possible RSSI value or within the allowable variance), the AV can continue along the first heading, slow to maintain the signal quality metric, or stop to maintain the signal quality metric (e.g., may use the AVs perception system to locate parking spots for the AV that may allow the AV to maintain heading, pose, elevation, etc. that are optimized for optimal signal quality metrics). However, in response to determining that the signal quality metric for the first heading does not meet the set of thresholds (e.g., not meeting the highest possible RSSI value or within the allowable variance), the AV can adjust to move according to the second heading.

At step 410, the process 400 includes receiving, via the wireless transceiver, a second set of data from the base station. In some embodiments, the data received from the base station may be explicitly for signal quality metric determination or may be data associated with navigation of the AV e.g., either for current navigation or association with previous navigation of the AV such as sensor data, route data, etc. In some instances, data received from the base station may include signal quality metrics calculated at the base station, e.g., for data transmitted from the AV to the base station. In such instances, AV navigation headings may be modified in response to signal quality metrics reported by the base station, for example, to improve the receipt of data by the base station.

At step 412, the process 400 includes computing a second signal quality metric (e.g., an RSSI metric) based on the second set of data, wherein the second signal quality metric corresponds with the second heading of the AV.

At step 414, the process 400 includes determining an optimal heading for the AV to communicate with the base station based on the first signal quality metric and the second signal quality metric. Determinations of the optimal heading, pose, or location of the AV can be based on a comparison of signal quality metrics performed at different AV orientations, e.g., heading and or elevation. For example, the first signal quality metric (or first RSSI metric) can be compared with the second signal quality metric (or second RSSI metric) to determine which AV orientation corresponds with the greatest received signal power, e.g., for transmissions sent from the base station to the AV. As discussed above, a separate process can be performed to determine an optimal elevation of the AV, such as by positioning the AV at a first elevation with respect to the base station, receiving a third set of data from the base station, and computing a third signal quality metric for the base station based on the third set of data. In such instances, the third signal quality metric can be compared with signal quality metrics calculated for other AV elevations. For example, the AV can be repositioned at a second elevation with respect to the base station to receive a fourth set of data from the base station in order to compute a fourth signal quality metric for the base station based on the fourth set of data.

In some aspects, optimal heading, elevation and/or pose parameters may be stored for future use. For example, heading/elevation parameters can be associated with a particular base station and/or AV so that the same AV may default to an approach of the base station using a heading and/or elevation that was previously known to yield the best signal quality metrics for signals/data transacted with the base station. Depending on the implementation, heading and/or elevation parameters may be associated with a particular AV configuration, or a configuration of the AV's transceiver system. As such, optimal heading/elevation parameters determined by one AV may be communicated to one or more other AVs, for example, that have the same (or a similar) configuration. By communicating optimal heading/elevation parameters to other AVs, those vehicles may benefit by selecting an optimal heading (or elevation) in relation to the base station, without the need to iterate across different heading/elevation/pose parameters.

In some aspects, the AV stack may be triggered to be more inclined to yield to oncoming traffic, pedestrians, etc. and/or take a route that allows the AV to continue to benefit from improved signal quality metrics (e.g., a signal quality metric that meet the set of thresholds). Accordingly, the AV may prolong the time period during which the AV is associated with a given optimal heading, elevation, pose, or location that produces beneficial signal quality metrics and allows for improved data upload and/or download. Further, when it is determined that a particular pose, heading, elevation, conducting a particular maneuver, etc. results in improved signal quality metrics, the AV stack can be triggered to emphasize or otherwise promote taking actions that replicate these route characteristics; however, the AV stack can maintain autonomy with an emphasis on taking logical routes that do not unduly promote delays (e.g., within time delay thresholds) or compromise safety and/or collisions.

Figure 5:
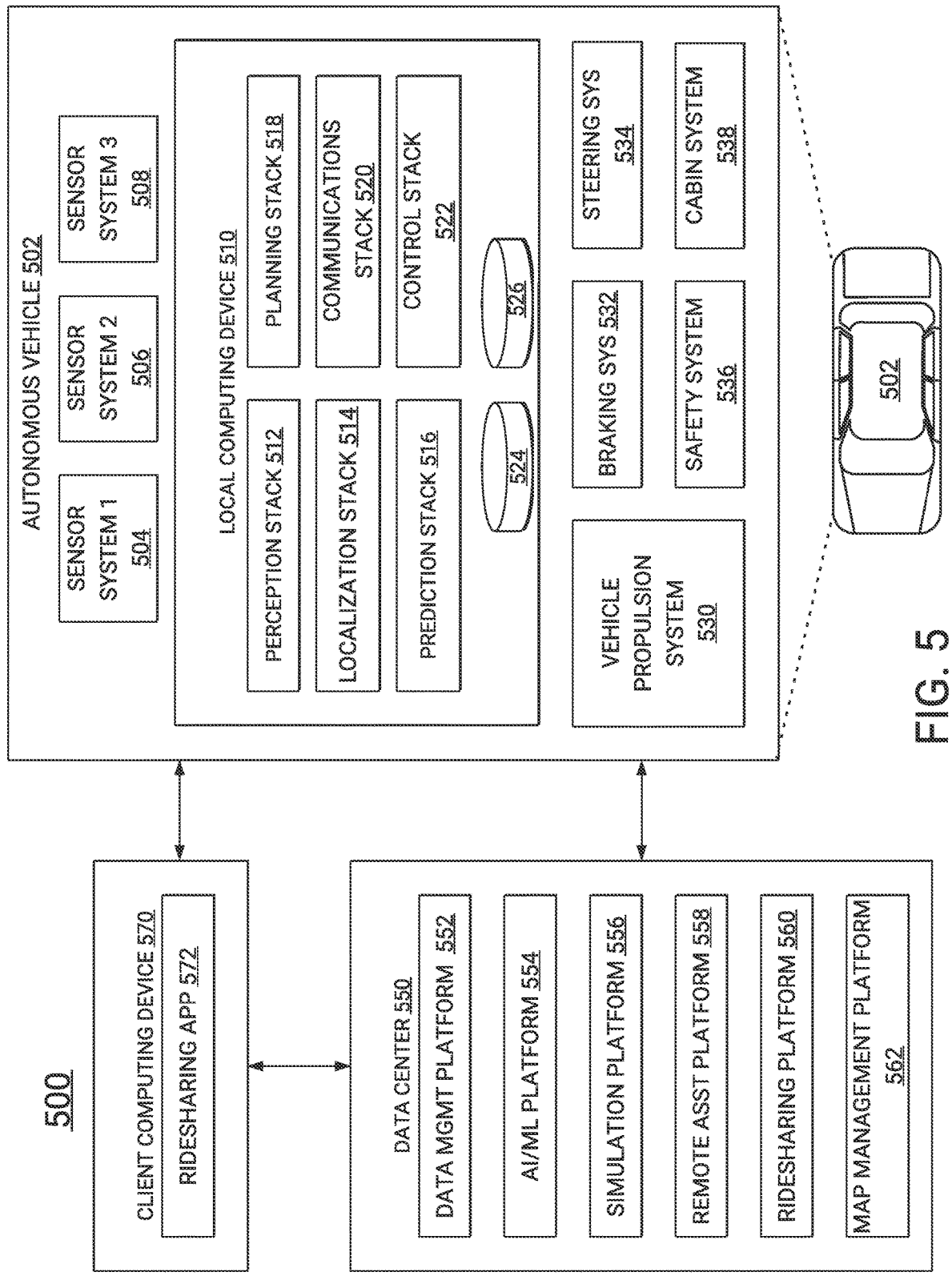
FIG. 5 illustrates an example system environment that can be used to facilitate AV dispatch and operations, according to some aspects of the disclosed technology.

FIG. 5 is a diagram illustrating an example autonomous vehicle (AV) environment 500, according to some examples of the present disclosure. One of ordinary skill in the art will understand that, for the AV environment 500 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include one or more types of sensors and can be arranged about the AV 502. For instance, the sensor systems 504-508 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other examples may include any other number and type of sensors.

The AV 502 can also include several mechanical systems that can be used to maneuver or operate the AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some examples, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a localization stack 514, a prediction stack 516, a planning stack 518, a communications stack 520, a control stack 522, an AV operational database 524, and an HD geospatial database 526, among other stacks and systems.

The perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can identify environmental uncertainties, such as where to look for moving objects, flag areas that may be obscured or blocked from view, and so forth. In some examples, an output of the perception stack 512 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some cases, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The prediction stack 516 can receive information from the localization stack 514 and objects identified by the perception stack 512 and predict a future path for the objects. In some examples, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

The planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

The control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

The communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 526 can store HD maps and related data of the streets upon which the AV 502 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508, stacks 512-522, and other components of the AV 502 and/or data received by the AV 502 from remote systems (e.g., the data center 550, the client computing device 570, etc.). In some examples, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

The data center 550 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 550 can include one or more computing devices remote to the local computing device 510 for managing a fleet of AVs and AV-related services. For example, in addition to managing the AV 502, the data center 550 may also support a ridehailing service (e.g., a ridesharing service), a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridehailing/ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ridehailing platform 560, and a map management platform 562, among other systems.

The data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridehailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridehailing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridehailing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/MIL platform 554 or other system of the data center 550, the remote assistance platform 558 can prepare instructions for one or more stacks or other components of the AV 502.

The ridehailing platform 560 can interact with a customer of a ridehailing service via a ridehailing application 572 executing on the client computing device 570. The client computing device 570 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 572. The client computing device 570 can be a customer's mobile computing device or a computing device integrated with the AV 502 (e.g., the local computing device 510). The ridehailing platform 560 can receive requests to pick up or drop off from the ridehailing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridehailing platform 560 may incorporate the map viewing services into the client application 572 to enable passengers to view the AV 502 in transit en route to a pick-up or drop-off location, and so on.

While the autonomous vehicle 502, the local computing device 510, and the autonomous vehicle environment 500 are shown to include certain systems and components, one of ordinary skill will appreciate that the autonomous vehicle 502, the local computing device 510, and/or the autonomous vehicle environment 500 can include more or fewer systems and/or components than those shown in FIG. 5. For example, the autonomous vehicle 502 can include other services than those shown in FIG. 5 and the local computing device 510 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 5. An illustrative example of a computing device and hardware components that can be implemented with the local computing device 510 is described below with respect to FIG. 6.

Figure 6:
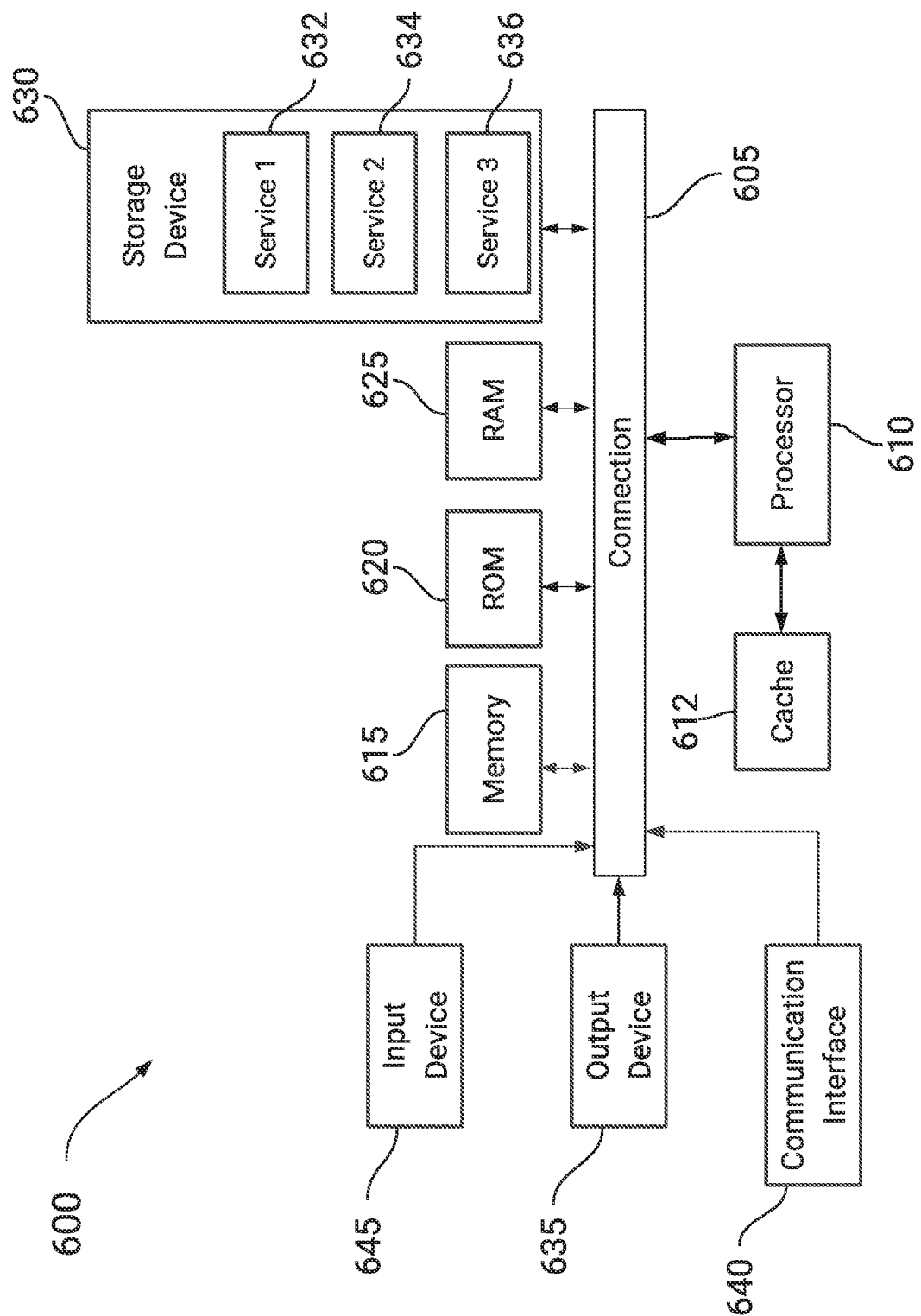
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Illustrative examples of the disclosure include:

Aspect 1: An apparatus comprising: at least one memory; a wireless transceiver; and at least one processor coupled to the at least one memory and the wireless transceiver, the at least one processor configured to: navigate an autonomous vehicle (AV) toward a base station along a first heading; receive, via the wireless transceiver, a first set of data from the base station; compute a signal quality metric for the base station based on the first set of data, wherein the first signal quality metric corresponds with the first heading of the AV; navigate the AV toward the base station along a second heading, wherein the second heading is different than the first heading; receive, via the wireless transceiver, a second set of data from the base station; compute a second signal quality metric for the base station based on the second set of data, wherein the second signal quality metric corresponds with the second heading of the AV; and determine an optimal heading for the AV to communicate with the base station based on the first signal quality metric and the second signal quality metric.

Aspect 2: The apparatus of claim 1, wherein the at least one processor is further configured to: position the AV at a first elevation with respect to the base station; receive, via the wireless transceiver, a third set of data from the base station; compute a third signal quality metric for the base station based on the third set of data; position the AV at a second elevation with respect to the base station; receive, via the wireless transceiver, a fourth set of data from the base station; compute a fourth signal quality metric for the base station based on the fourth set of data; and determine an optimal elevation for the AV to communicate with the base station based on the third signal quality metric and the fourth signal quality metric.

Aspect 3: The apparatus of aspect 2, wherein to position the AV at the first elevation with respect to the base station, the at least one processor is further configured to: actuate at least one air compressor of the AV to increase or decrease an elevation of the AV.

Aspect 4: The apparatus of any of aspects 1-2, wherein the at least one processor is further configured to: automatically transmit road data from the AV to the base station, via the wireless transceiver, if it is determined that the AV is positioned along an optimal heading for the AV to communicate with the base station.

Aspect 5: The apparatus of any of aspects 1-3, wherein the first signal quality metric comprises a Received Signal Strength Indicator (RSSI).

Aspect 6: The apparatus of any of aspects 1-4, wherein the first heading corresponds to a first azimuth angle between the AV and the base station, and wherein the second heading corresponds with a second azimuth angle between the AV and the base station.

Aspect 7: The apparatus of any of aspects 1-5, wherein the wireless transceiver is configured to transact data with the base station using a millimeter band (mmWave).

Aspect 8: A computer-implemented method, comprising: navigating an autonomous vehicle (AV) toward a base station along a first heading; receiving, via a wireless transceiver, a first set of data from the base station; computing a signal quality metric for the base station based on the first set of data, wherein the first signal quality metric corresponds with the first heading of the AV; navigating the AV toward the base station along a second heading, wherein the second heading is different than the first heading; receiving, via the wireless transceiver, a second set of data from the base station; computing a second signal quality metric for the base station based on the second set of data, wherein the second signal quality metric corresponds with the second heading of the AV; and determining an optimal heading for the AV to communicate with the base station based on the first signal quality metric and the second signal quality metric.

Aspect 9: The method of aspect 8, further comprising: positioning the AV at a first elevation with respect to the base station; receiving, via the wireless transceiver, a third set of data from the base station; computing a third signal quality metric for the base station based on the third set of data; positioning the AV at a second elevation with respect to the base station; receiving, via the wireless transceiver, a fourth set of data from the base station; computing a fourth signal quality metric for the base station based on the fourth set of data; and determining an optimal elevation for the AV to communicate with the base station based on the third signal quality metric and the fourth signal quality metric.

Aspect 10: The method of any of aspects 8-9, wherein positioning the AV at the first elevation with respect to the base station, further comprises: actuating at least one air compressor of the AV to increase or decrease an elevation of the AV.

Aspect 11: The method of any of aspects 8-10, further comprising: automatically transmitting road data from the AV to the base station, via the wireless transceiver, if it is determined that the AV is positioned along an optimal heading for the AV to communicate with the base station.

Aspect 12: The method of any of aspects 8-11, wherein the first signal quality metric comprises a Received Signal Strength Indicator (RSSI).

Aspect 13: The method of any of aspects 8-12, wherein the first heading corresponds to a first azimuth angle between the AV and the base station, and wherein the second heading corresponds with a second azimuth angle between the AV and the base station.

Aspect 14: The method of any of aspects 8-13, wherein the wireless transceiver is configured to transact data with the base station using a millimeter band (mmWave).

Aspect 15: A non-transitory computer-readable storage medium comprising at least one instruction for causing a computer or processor to: navigate an autonomous vehicle (AV) toward a base station along a first heading; receive, via a wireless transceiver, a first set of data from the base station; compute a signal quality metric for the base station based on the first set of data, wherein the first signal quality metric corresponds with the first heading of the AV; navigate the AV toward the base station along a second heading, wherein the second heading is different than the first heading; receive, via the wireless transceiver, a second set of data from the base station; compute a second signal quality metric for the base station based on the second set of data, wherein the second signal quality metric corresponds with the second heading of the AV; and determine an optimal heading for the AV to communicate with the base station based on the first signal quality metric and the second signal quality metric.

Aspect 16: The non-transitory computer-readable storage medium of aspect 15, wherein the at least one instruction is further configured to cause the computer or processor to: position the AV at a first elevation with respect to the base station; receive, via the wireless transceiver, a third set of data from the base station; compute a third signal quality metric for the base station based on the third set of data; position the AV at a second elevation with respect to the base station; receive, via the wireless transceiver, a fourth set of data from the base station; compute a fourth signal quality metric for the base station based on the fourth set of data; and determine an optimal elevation for the AV to communicate with the base station based on the third signal quality metric and the fourth signal quality metric.

Aspect 17: The non-transitory computer-readable storage medium of any of aspects 15-17, wherein to position the AV at the first elevation with respect to the base station, the at least one instruction is further configured to cause the computer or processor to: actuate at least one air compressor of the AV to increase or decrease an elevation of the AV.

Aspect 18: The non-transitory computer-readable storage medium of any of aspects 15-17, wherein the at least one instruction is further configured to cause the computer or processor to: automatically transmit road data from the AV to the base station, via the wireless transceiver, if it is determined that the AV is positioned along an optimal heading for the AV to communicate with the base station.

Aspect 19: The non-transitory computer-readable storage medium of any of aspects 15-17, wherein the first signal quality metric comprises a Received Signal Strength Indicator (RSSI)

Aspect 20: The non-transitory computer-readable storage medium of any of aspects 15-17, wherein the first heading corresponds to a first azimuth angle between the AV and the base station, and wherein the second heading corresponds with a second azimuth angle between the AV and the base station.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An apparatus comprising:
   at least one memory;
   a wireless transceiver; and
   at least one processor coupled to the at least one memory and the wireless transceiver, the at least one processor configured to:
   navigate an autonomous vehicle (AV) toward a base station along a first heading;
   receive, via the wireless transceiver, a first set of data from the base station;
   compute a signal quality metric for the base station based on the first set of data, wherein the first signal quality metric corresponds with the first heading of the AV;
   navigate the AV toward the base station along a second heading, wherein the second heading is different than the first heading;
   receive, via the wireless transceiver, a second set of data from the base station;
   compute a second signal quality metric for the base station based on the second set of data, wherein the second signal quality metric corresponds with the second heading of the AV;
   determine an optimal heading for the AV to communicate with the base station based on the first signal quality metric and the second signal quality metric; and
   automatically transmit road data from the AV to the base station, via the wireless transceiver, if it is determined that the AV is positioned along the optimal heading for the AV to communicate with the base station.

2. The apparatus of claim 1, wherein the at least one processor is further configured to:
   position the AV at a first elevation with respect to the base station;
   receive, via the wireless transceiver, a third set of data from the base station;
   compute a third signal quality metric for the base station based on the third set of data;
   position the AV at a second elevation with respect to the base station;
   receive, via the wireless transceiver, a fourth set of data from the base station;
   compute a fourth signal quality metric for the base station based on the fourth set of data;
   and
   determine an optimal elevation for the AV to communicate with the base station based on the third signal quality metric and the fourth signal quality metric.

3. The apparatus of claim 2, wherein to position the AV at the first elevation with respect to the base station, the at least one processor is further configured to:
   actuate at least one air compressor of the AV to increase or decrease an elevation of the AV.

4. The apparatus of claim 1, wherein the at least one processor is further configured to navigate the AV to position the AV along the optimal heading.

5. The apparatus of claim 1, wherein the first signal quality metric comprises a Received Signal Strength Indicator (RSSI).

6. The apparatus of claim 1, wherein the first heading corresponds to a first azimuth angle between the AV and the base station, and wherein the second heading corresponds with a second azimuth angle between the AV and the base station.

7. The apparatus of claim 1, wherein the wireless transceiver is configured to transact data with the base station using a millimeter band (mmWave).

8. A computer-implemented method, comprising:
   navigating an autonomous vehicle (AV) toward a base station along a first heading;
   receiving, via a wireless transceiver, a first set of data from the base station;
   computing a signal quality metric for the base station based on the first set of data, wherein the first signal quality metric corresponds with the first heading of the AV;
   navigating the AV toward the base station along a second heading, wherein the second heading is different than the first heading;
   receiving, via the wireless transceiver, a second set of data from the base station;
   computing a second signal quality metric for the base station based on the second set of data, wherein the second signal quality metric corresponds with the second heading of the AV;

determining an optimal heading for the AV to communicate with the base station based on the first signal quality metric and the second signal quality metric; and automatically transmitting road data from the AV to the base station, via the wireless transceiver, if it is determined that the AV is positioned along an optimal heading for the AV to communicate with the base station.

9. The method of claim 8, further comprising:
positioning the AV at a first elevation with respect to the base station;
receiving, via the wireless transceiver, a third set of data from the base station;
computing a third signal quality metric for the base station based on the third set of data;
positioning the AV at a second elevation with respect to the base station;
receiving, via the wireless transceiver, a fourth set of data from the base station;
computing a fourth signal quality metric for the base station based on the fourth set of data; and
determining an optimal elevation for the AV to communicate with the base station based on the third signal quality metric and the fourth signal quality metric.

10. The method of claim 9, wherein positioning the AV at the first elevation with respect to the base station, further comprises:
actuating at least one air compressor of the AV to increase or decrease an elevation of the AV.

11. The method of claim 8, further comprising:
navigating the AV to position the AV along the optimal heading.

12. The method of claim 8, wherein the first signal quality metric comprises a Received Signal Strength Indicator (RSSI).

13. The method of claim 8, wherein the first heading corresponds to a first azimuth angle between the AV and the base station, and wherein the second heading corresponds with a second azimuth angle between the AV and the base station.

14. The method of claim 8, wherein the wireless transceiver is configured to transact data with the base station using a millimeter band (mmWave).

15. A non-transitory computer-readable storage medium comprising at least one instruction for causing a computer or processor to:
navigate an autonomous vehicle (AV) toward a base station along a first heading;
receive, via a wireless transceiver, a first set of data from the base station;
compute a signal quality metric for the base station based on the first set of data, wherein the first signal quality metric corresponds with the first heading of the AV;
navigate the AV toward the base station along a second heading, wherein the second heading is different than the first heading;
receive, via the wireless transceiver, a second set of data from the base station;
compute a second signal quality metric for the base station based on the second set of data, wherein the second signal quality metric corresponds with the second heading of the AV;
determine an optimal heading for the AV to communicate with the base station based on the first signal quality metric and the second signal quality metric; and
automatically transmit road data from the AV to the base station, via the wireless transceiver, if it is determined that the AV is positioned along an optimal heading for the AV to communicate with the base station.

16. The non-transitory computer-readable storage medium of claim 15, wherein the at least one instruction is further configured to cause the computer or processor to:
position the AV at a first elevation with respect to the base station;
receive, via the wireless transceiver, a third set of data from the base station;
compute a third signal quality metric for the base station based on the third set of data; position the AV at a second elevation with respect to the base station;
receive, via the wireless transceiver, a fourth set of data from the base station;
compute a fourth signal quality metric for the base station based on the fourth set of data;
and
determine an optimal elevation for the AV to communicate with the base station based on the third signal quality metric and the fourth signal quality metric.

17. The non-transitory computer-readable storage medium of claim 16, wherein to position the AV at the first elevation with respect to the base station, the at least one instruction is further configured to cause the computer or processor to:
actuate at least one air compressor of the AV to increase or decrease an elevation of the AV.

18. The non-transitory computer-readable storage medium of claim 15, wherein the at least one instruction is further configured to cause the computer or processor to:
navigate the AV to position the AV along the optimal heading.

19. The non-transitory computer-readable storage medium of claim 15, wherein the first signal quality metric comprises a Received Signal Strength Indicator (RSSI).

20. The non-transitory computer-readable storage medium of claim 15, wherein the first heading corresponds to a first azimuth angle between the AV and the base station, and wherein the second heading corresponds with a second azimuth angle between the AV and the base station.

* * * * *